(12) United States Patent
Hattori

(10) Patent No.: US 6,702,450 B2
(45) Date of Patent: Mar. 9, 2004

(54) MIRROR ASSEMBLY

(75) Inventor: Yasunori Hattori, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 119 days.

(21) Appl. No.: 10/017,397

(22) Filed: Dec. 18, 2001

(65) Prior Publication Data
US 2002/0085296 A1 Jul. 4, 2002

(30) Foreign Application Priority Data
Dec. 28, 2000 (JP) ........................................ 2000-402728

(51) Int. Cl.⁷ ............................................... G02B 7/182
(52) U.S. Cl. ...................................... 359/872; 248/476
(58) Field of Search ................................ 359/871, 872, 359/875, 879; 248/476, 549

(56) References Cited

U.S. PATENT DOCUMENTS 4,998,814 A  3/1991 Perry
5,820,097 A * 10/1998 Spooner .................... 248/549
6,039,449 A * 3/2000 Dolan et al. ................ 359/871

* cited by examiner

Primary Examiner—Euncha Cherry
(74) Attorney, Agent, or Firm—Nixon Peabody, LLP

(57) ABSTRACT

A mirror assembly for a vehicle has a visor which houses a mirror main body (a mirror), a stay cover provided between the visor and the vehicle, and a base which is assembled so as to pass through the stay cover. In the present invention, the base, which is mechanically connected to the visor and a vehicle body, has a pair of front and rear walls, which are disposed along a longitudinal direction of the vehicle and which oppose one another, and a pair of upper and lower walls which are disposed along a vertical direction of the vehicle and oppose one another. In order to ensure strength with respect to all conditions, a first rib is provided between the front and rear walls, and a second rib is provided between the upper and lower walls.

11 Claims, 13 Drawing Sheets

MIRROR ASSEMBLY

BACKGROUND OF THE INVENTION

1. Field of the Invention

The present invention relates to a mirror assembly such as a door mirror or the like which is mounted to a door of a vehicle.

2. Description of the Related Art

Door mirrors, which are mounted to the outer side of the doors at the driver's seat side and at the front passenger's seat side, are an example of equipment which a vehicle occupant uses to confirm the region substantially at the rear side of the vehicle.

Such a door mirror has a visor which is formed as a box form or a bowl form which opens substantially toward the rear of the vehicle, and which houses a mirror main body (a mirror) in a vicinity of the opening portion. A stay cover is provided between the visor and the vehicle, and a base passes through the stay cover. The base is mechanically connected to both the visor and the vehicle body, and the visor is connected to the vehicle body by the base.

Wind pressure while the vehicle is traveling is applied to the visor of this type of door mirror. Thus, the base is formed as a substantial box form whose one substantially longitudinal direction end is open, and ensures sufficient strength with respect to wind pressure while reducing costs and weight.

The load of the visor, the mirror main body, and (in the case of a structure in which the mirror main body is rotated by a motor or the like) the motor or the like, i.e., load directed in a substantially downward direction of the vehicle, is applied to the connecting portion side of the base with the vehicle.

Coping with such a load by, for example, making the thickness of the base thicker at portions thereof, has been conceived of. However, costs increase due to making the thickness of the base thicker at portions thereof to the extent that sufficient strength can be ensured.

SUMMARY OF THE INVENTION

In view of the aforementioned, an object of the present invention is to provide a mirror assembly which, at a low cost, can ensure sufficient strength with respect to wind pressure while the vehicle is traveling and with respect to an overall load.

A first aspect of the present invention is a mirror assembly for mounting to a vehicle comprising: a visor, a mirror main body accommodated in the visor, the mirror main body including a reflecting surface, and a base provided between the vehicle and the visor, connecting the visor to the vehicle when the mirror assembly is mounted thereto, the base including a base main body comprising: (a) a plurality of front and rear walls opposing one another along a substantially longitudinal direction of the vehicle; (b) a plurality of upper and lower walls which oppose one another along a substantially vertical direction of the vehicle and which are joined integrally to the front and rear walls at a side of the front and rear walls opposite the vehicle; (c) a first rib which is provided between the front and rear walls for supplementing strength of the base main body along the substantially vertical direction of the vehicle; and (d) a second rib which provided between the upper and lower walls for supplementing strength of the base main body along the substantially longitudinal direction of the vehicle.

In accordance with the mirror assembly of the above-described structure, the visor, which houses the mirror main body, is connected to the vehicle via the base.

Here, the vehicle front side of the base main body which forms the base, at which vehicle front side load of the visor, the mirror main body, and the like is applied, is formed by the plurality of front and rear walls which face front and back. Thus, the strength in a direction along the substantially vehicle vertical direction is improved. Moreover, the first rib is provided between the front and rear walls, and the strength in the direction along the substantially vehicle vertical direction is improved even more.

In contrast, at the portion between the front and rear walls and the visor, at which portion wind pressure is applied while the vehicle is traveling, the base main body is formed by the plurality of upper and lower walls which face upward and downward. Thus, the strength in a direction along the substantially vehicle longitudinal direction is improved. Moreover, the second rib is provided between the upper and lower walls, and the strength in the direction along the substantially vehicle longitudinal direction is improved even more.

In the present mirror assembly, strength in the necessary directions is supplemented at the portions necessary for the above-described structure, and thus, costs can be decreased.

In the present invention, preferably, a substantially vehicle lower side end portion of a portion of the base main body, at which portion the front and rear walls are provided, is open.

In the mirror assembly of the above-described structure, at the portion where the front and rear walls, which form the base main body, are provided, the substantially vehicle lower side is open. Thus, even if rain water enters into or water drops due to dew condensation adhere to the region between the front and rear walls, such water drops fall down and can be drained.

A second aspect of the present invention is an assembly for mounting to a vehicle and supporting a mirror, the assembly comprising: a visor and a mirror driving portion housed therein, and the visor being formed integrally in a shape corresponding generally to a box which opens rearwardly relative to the vehicle when the assembly is mounted thereto; a base including a generally triangular, plate-shaped base portion, and a base main body comprising a substantially lower side that is open and connected to the base portion along a longitudinal direction of the vehicle when mounted thereto, and a pair of front and rear walls which are disposed along the longitudinal direction of the vehicle and which oppose one another, and a pair of upper and lower walls joined to the front and rear walls and which oppose one another along a vertical direction of the vehicle, and a first rib provided between the front and rear walls, and a second rib provided between the upper and lower walls; and a stay cover provided between the visor and the base, and including a base portion shaped substantially similarly to the base portion of the base and larger than the base portion of the base.

A third aspect of the present invention is a mirror assembly for mounting to a vehicle exterior, the mirror assembly comprising: (a) a visor housing a mirror; and (b) a base including: (i) a vehicle side section comprising a first rib and front and rear walls defining an open region therebetween, the first rib being disposed in the open region, the front and rear walls and first rib projecting from the vehicle side section substantially parallel to one another, the vehicle side section including an end adapted for mounting to the vehicle exterior with the front and rear walls and first rib all projecting from the vehicle side section in a direction substantially orthogonal to the vehicle longitudinal and lateral axes; and (ii) a visor side section extending from the vehicle side section, the visor side section including a second rib and upper and lower walls defining another open region, the second rib being disposed in the other open region, the upper and lower walls and the second rib projecting from the visor side section in a direction substantially orthogonal to the projection direction of the front and rear walls and first rib, and the visor side section including an end adapted for connection to the visor.

DESCRIPTION OF THE PREFERRED EMBODIMENTS

<Structure of Visor 12>

Figure 1:
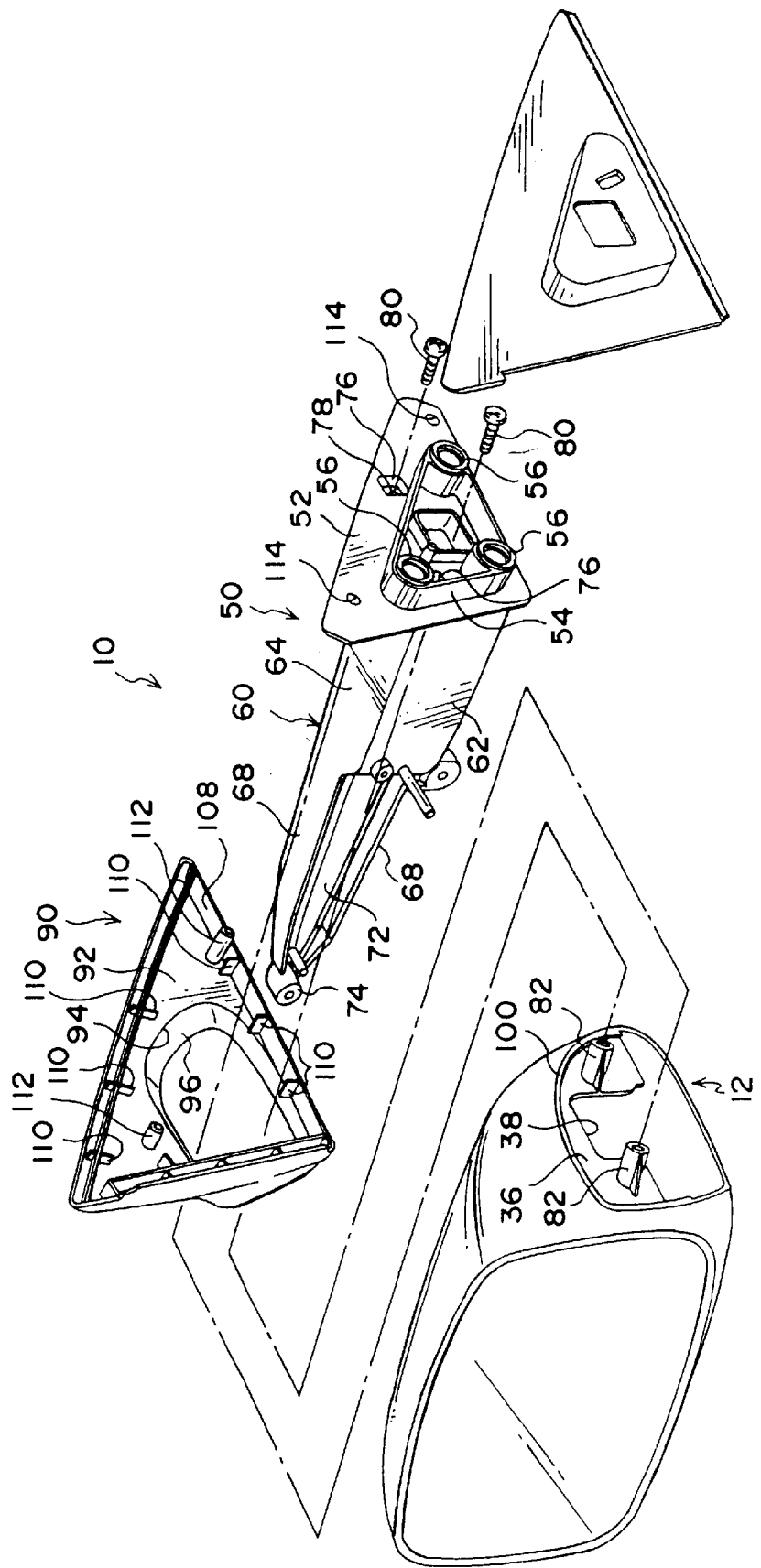
FIG. 1 is a schematic perspective view of a mirror assembly relating to an embodiment of the present invention.

The structure of a door mirror 10, which serves as a mirror assembly relating to an embodiment of the present invention, is shown in an exploded perspective view in FIG. 1.

As shown in FIG. 1, the door mirror 10 includes a visor 12. The visor 12 is molded integrally from a synthetic rein material in a substantial box shape or a substantial bowl shape which opens substantially toward the rear of the vehicle (not shown) in the state in which the visor 12 is mounted to the vehicle.

Figure 2:
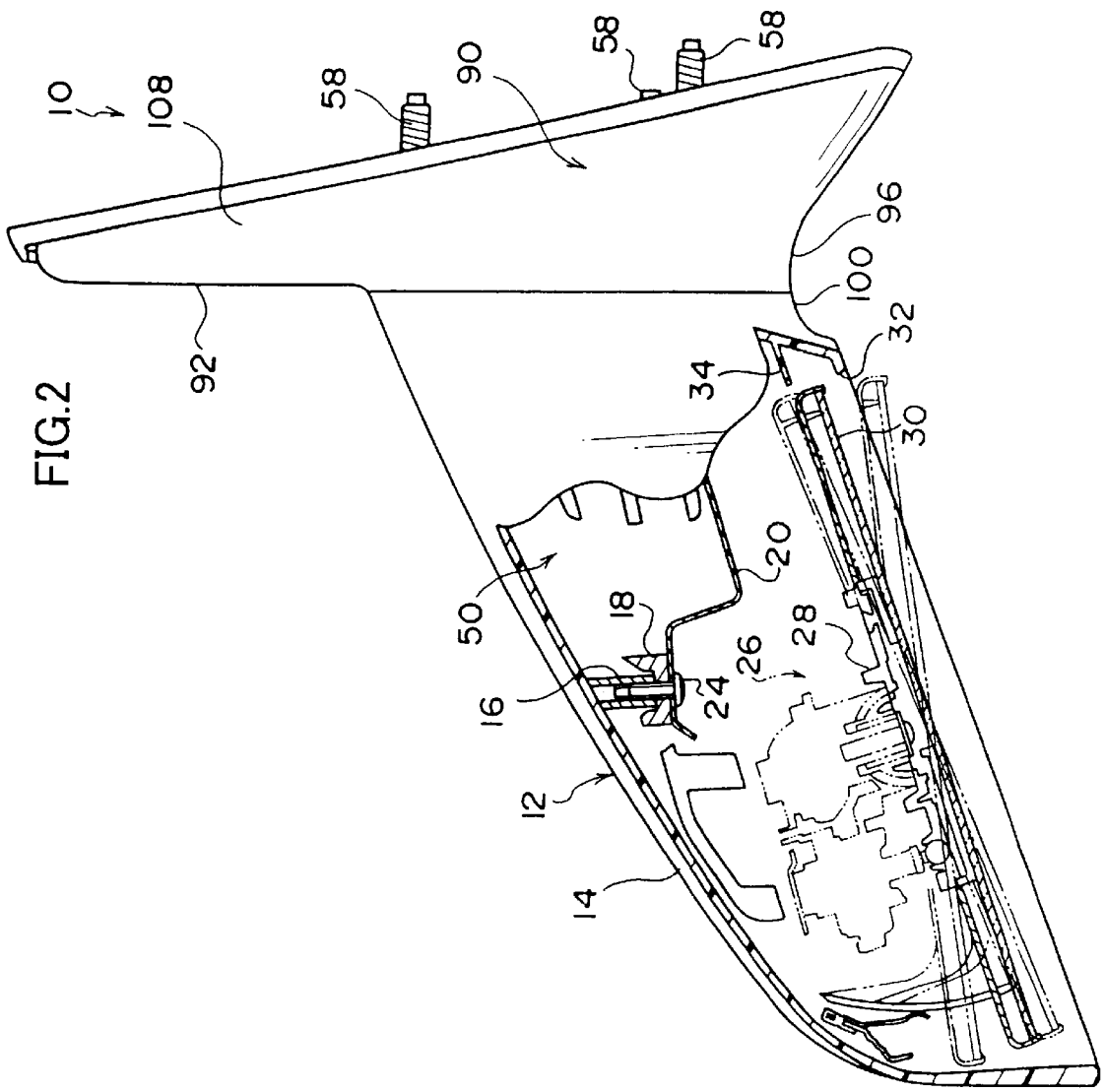
FIG. 2 is a partially broken plan view of the mirror assembly relating to the embodiment of the present invention.
Figure 5:
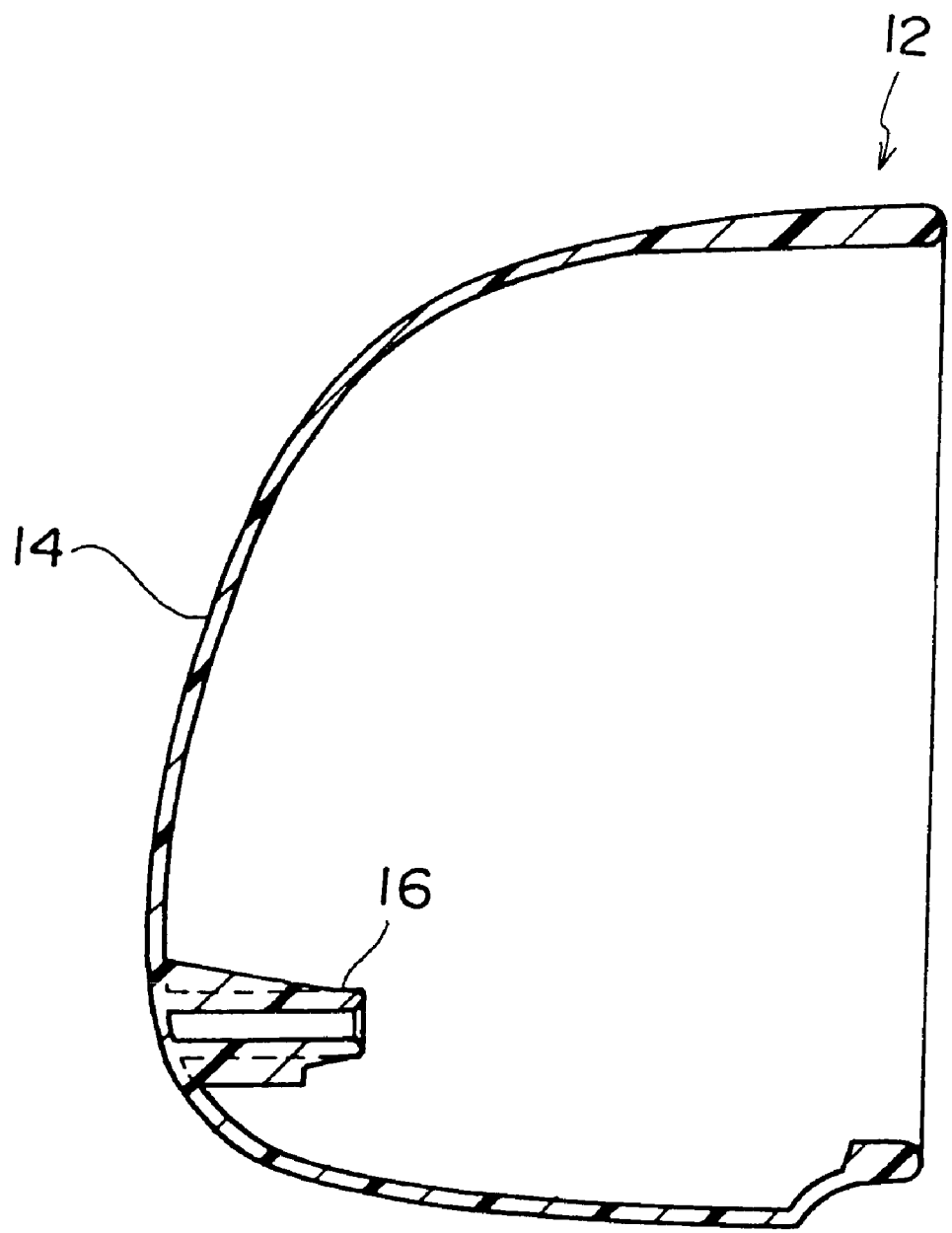
FIG. 5 is a side sectional view of the visor.

As shown in FIGS. 2 and 5, a boss 16 stands erect toward the opening direction side of the visor 12 from a bottom portion 14 of the visor 12. The boss 16 is formed on the whole as a hollow cylinder, and a receiving plate 18 is provided at an open end thereof. A supporting plate 20 is provided at the side of the receiving plate 18 opposite the side at which the boss 16 is provided. A male screw 24 passes through the supporting plate 20 and the receiving plate 18. Further, the male screw 24 enters coaxially into the interior of the boss 16 and screws together with the inner peripheral portion of the boss 16. In this way, the supporting plate 20 is fixed at the interior of the visor 12.

A mirror driving unit 26 is held at the supporting plate 20. A driving device such as a motor or the like is mounted to the mirror driving unit 26, and a plate shaped holder 28 is mounted to the mirror driving unit 26. Due to the driving force of the driving device, the holder 28 can be rotated by a predetermined angle with the substantially vertical direction of the vehicle and the substantially left-right direction of the vehicle being the axial directions.

A mirror main body 30 is disposed at the inner side of the visor 12 and in a vicinity of the open end of the visor 12. The mirror main body 30 is formed in a plate shape whose direction of thickness is substantially along the opening direction of the visor 12, and a reflecting surface is formed at the visor 12 opening end side of the mirror main body 30. The bottom portion 14 side of the mirror main body 30 is fixed to the holder 28. Accordingly, due to the motor of the mirror driving unit 26 operating, the mirror main body 30 rotates integrally with the holder 28, and the orientation of the reflecting surface of the mirror main body 30 is thereby changed.

Figure 4:
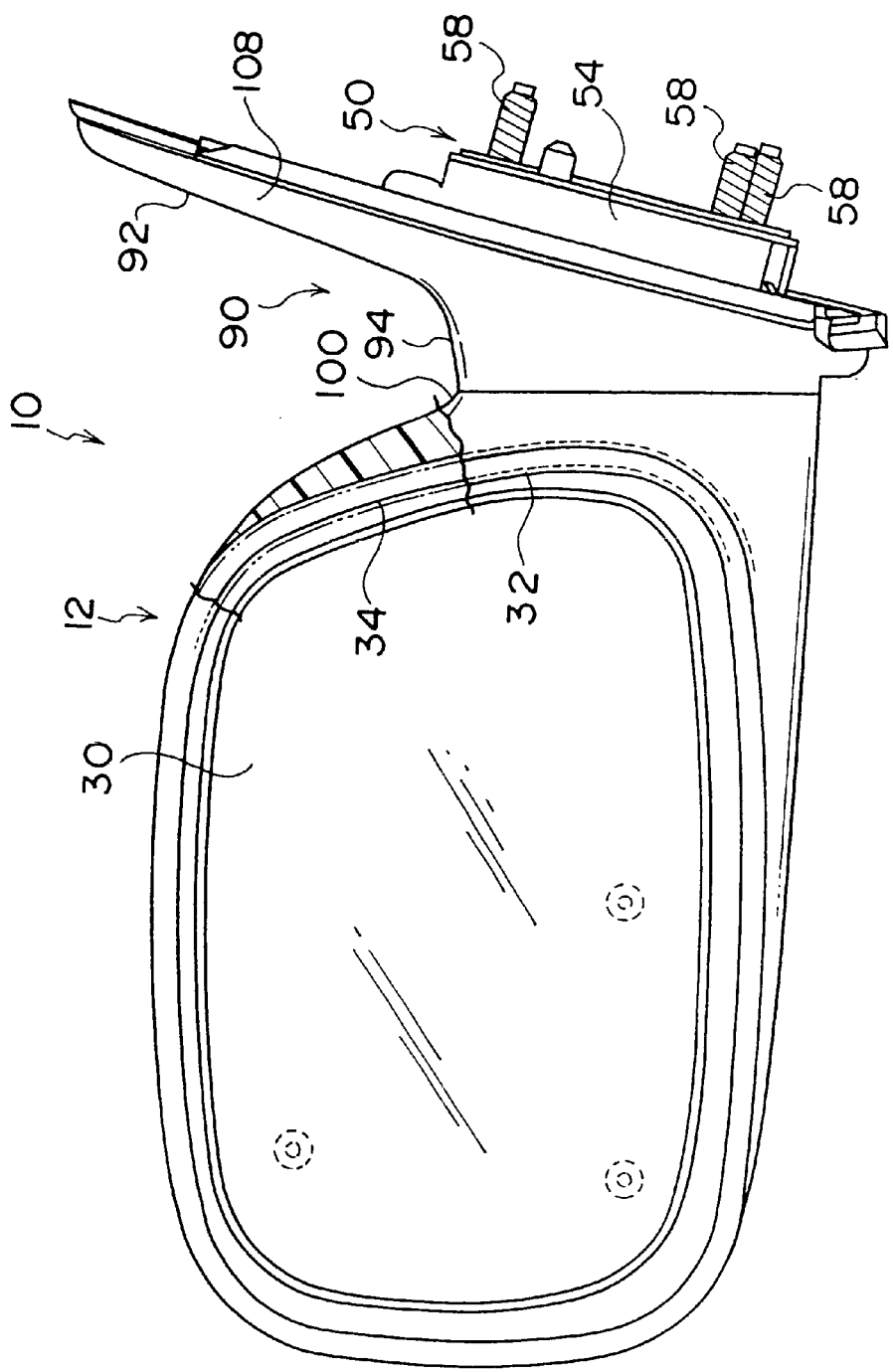
FIG. 4 is a partially broken front view of the mirror assembly relating to the embodiment of the present invention.

As shown in FIGS. 2 and 4, a collar portion 32 is formed toward the inner side of the opening end, at the portion, of the opening end of the visor 12, which portion is positioned at the vehicle body side when the door mirror 10 is mounted to the vehicle.

A shielding rib 34, which serves as a shielding portion, is formed so as to project from the inner peripheral portion of the visor 12, at a position which is further toward the bottom portion 14 side of the visor 12 than the collar portion 32. As shown in FIG. 2, the shielding rib 34 is formed in a plate shape which is thinner than the visor 12. The shielding rib 34 is formed to project from the inner peripheral portion of the visor 12 such that, when the mirror main body 30 is rotated around an axis with the axial direction being substantially the vertical direction of the vehicle until the portion, of the peripheral portions of the mirror main body 30, which portion which is positioned at the vehicle body side is displaced the furthest toward the bottom portion 14 side, the distal end portion of the shielding rib 34 opposes the vehicle body side outer peripheral portion of the mirror main body 30 substantially parallel to the reflecting surface of the door mirror 10.

Further, the dimension by which the shielding rib 34 projects from the inner peripheral portion of the visor 12 (i.e., the transverse dimension of the shielding rib 34) is set such that the shielding rib 34 does not interfere with the mirror main body 30 at the time when the mirror main body 30 rotates. However, the dimension by which the shielding rib 34 projects from the inner peripheral portion of the visor 12 (i.e., the transverse dimension of the shielding rib 34) is set such that the shielding rib 34 is positioned further toward the inner side of the visor 12 than a gap, along the direction of opening of the gap between the mirror main body 30 and the collar portion 32 at a regular rotational position of the mirror main body 30 (the state shown by the solid line in FIG. 2), and along the direction of opening of the gap between the collar portion 32 and the mirror main body 30 at the time when the vehicle body side outer peripheral portion of the mirror main body 30 is rotated the furthest toward the bottom portion 14 side.

Figure 3:
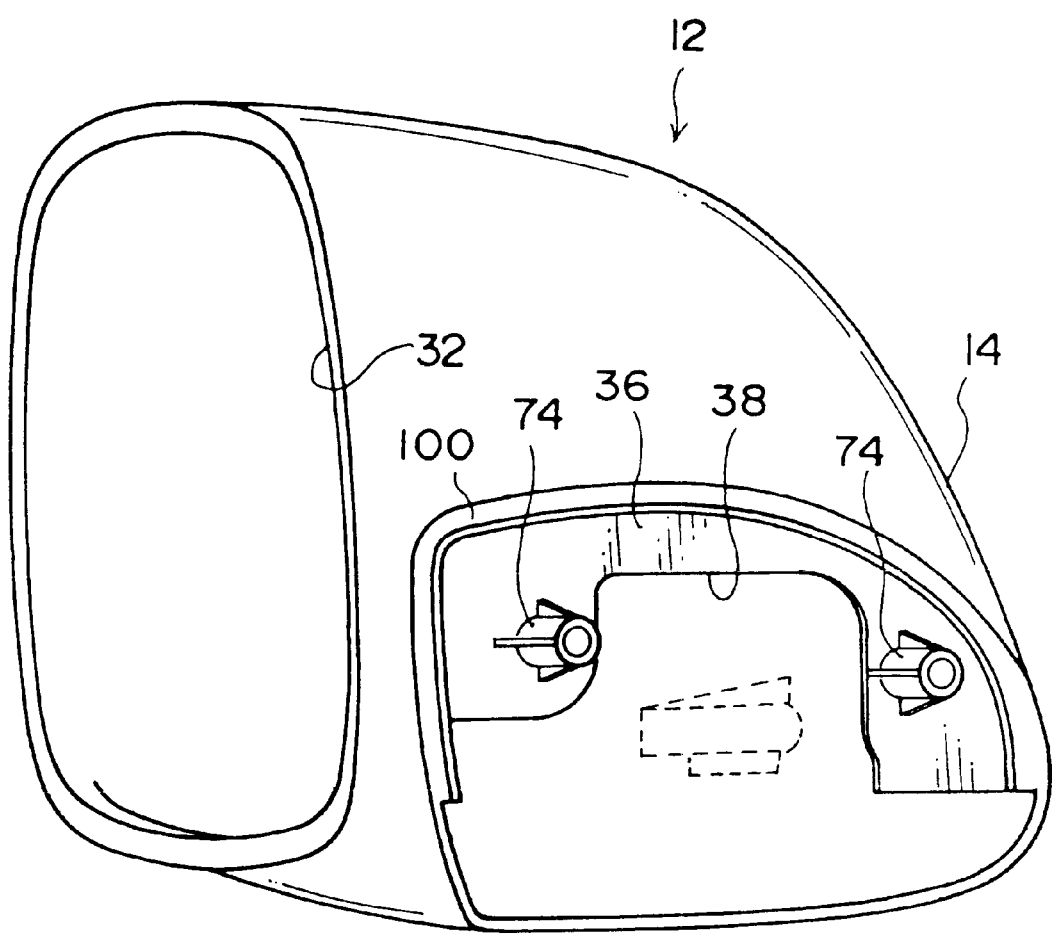
FIG. 3 is a side view of a visor as seen from a vehicle body.

Further, as shown in FIGS. 1 and 3, an opening portion 38 is formed in a side wall 36, at the vehicle body side, of the visor 12. A distal end side of a base 50 enters into the inner side of the visor 12 via this opening portion 38.

<Structure of Base 50>

The base 50 is a molded product which is formed overall from metal or a synthetic resin material. As shown in FIGS.

1 and 6, the base 50 is equipped with a substantially triangular, substantially plate-shaped base portion 52. A frame portion 54, which is tubular and which opens along the direction of thickness of the base portion 52, is formed integrally with the vehicle body side of the base portion 52. The frame portion 54 has a configuration which is substantially similar to that of the base portion 52 as seen along the direction of opening thereof. However, the frame portion 54 is a substantially triangular shape which is sufficiently smaller than the base portion 52. A boss 56, whose axial direction is substantially the direction of opening of the frame portion 54, is formed integrally at each of the corners of the frame portion 54. Bolts 58, which are shown in FIG. 4 and the like, are fixed to these bosses 56, and the bolts 58 are fixed to a supporting member (not shown) at the vehicle body side.

Figure 7:
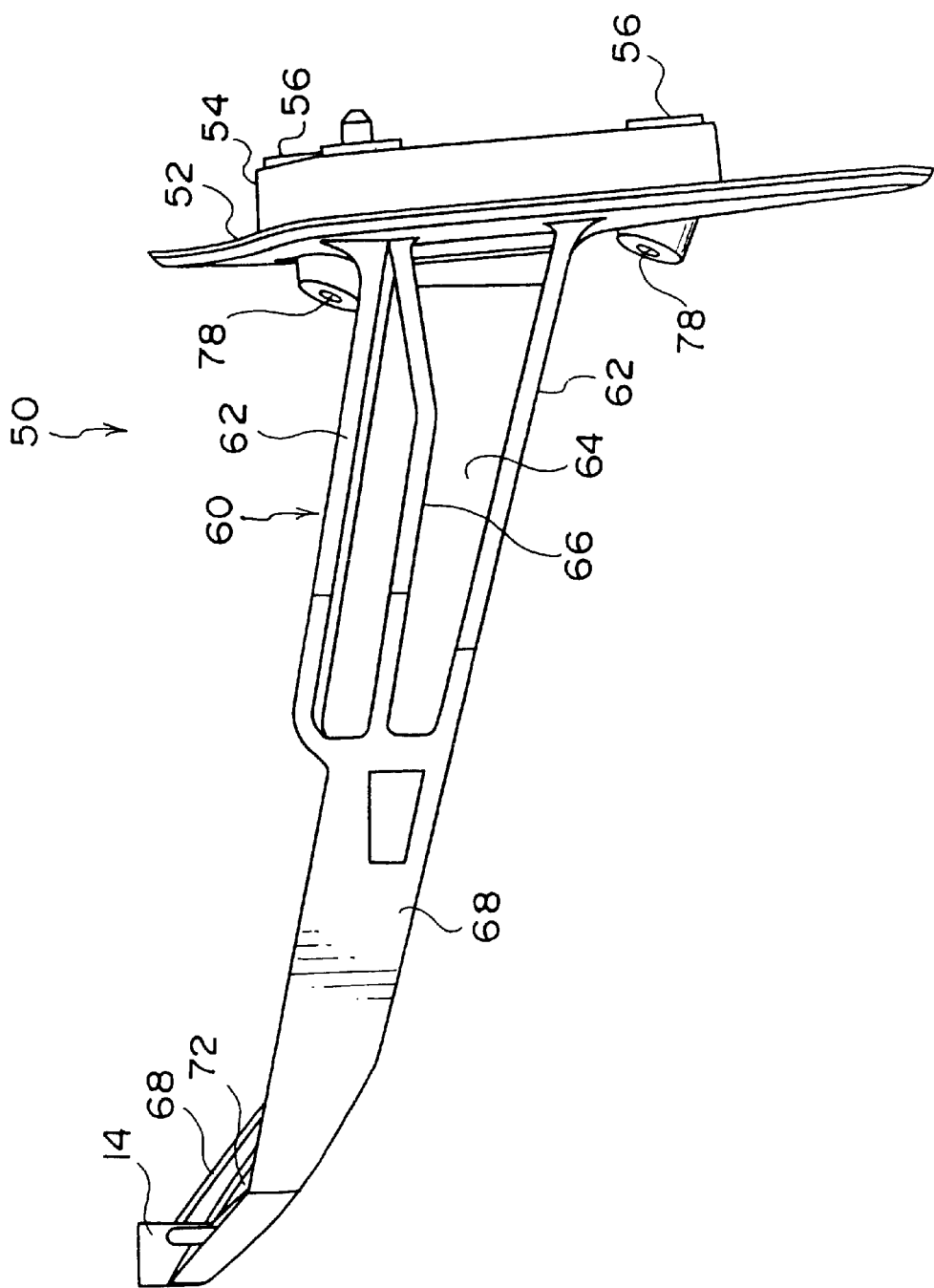
FIG. 7 is a bottom view of the base as seen from beneath.
Figure 8:
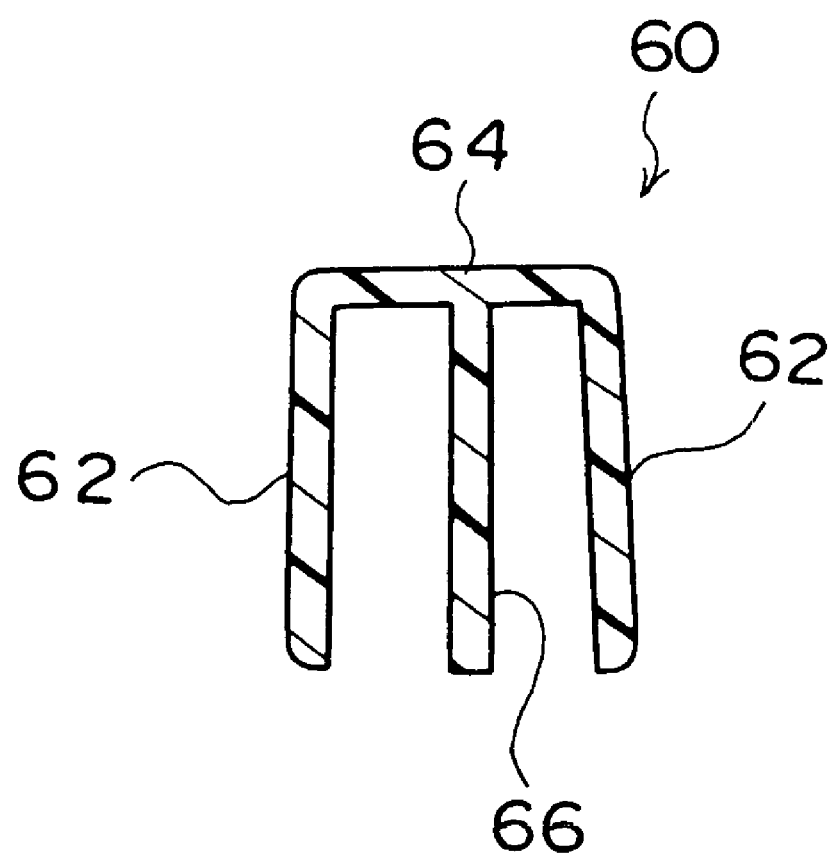
FIG. 8 is a cross-sectional view of a base main body at a front and rear walls portion.
Figure 9:
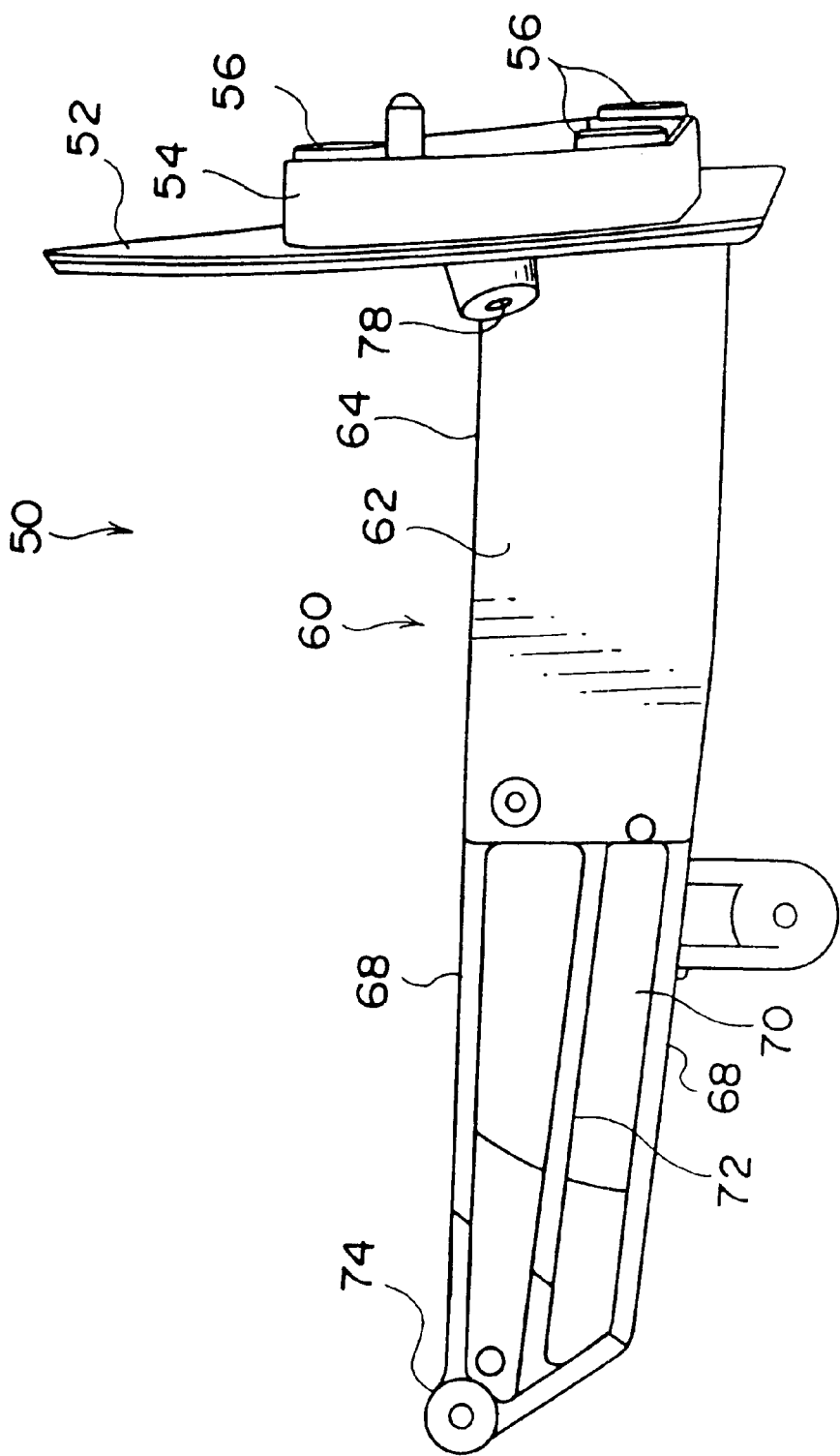
FIG. 9 is a front view of the base.

On the other hand, as shown in FIGS. 7 and 9, a base main body 60 is formed at the side of the base member 52 opposite the side at which the frame portion 54 is provided (i.e., the base main body 60 is formed at the side of the base member 52 opposite the vehicle body side thereof). The base main body 60 is provided with a pair of front and rear walls 62 which oppose one another substantially along the longitudinal direction of the vehicle. The longitudinal directions of the front and rear walls 62 run along a direction which is inclined substantially toward the vehicle longitudinal direction, with respect to the substantially vehicle left-right direction. Ones of longitudinal direction end portions of the front and rear walls 62 (i.e., the end portions thereof at the vehicle body side) are connected to the base portion 52. Further, an upper plate 64 is provided at the transverse direction upper sides (substantially the vehicle upper sides) of the front and rear walls 62. The longitudinal direction of the upper wall 64 is along the longitudinal direction of the front and rear walls 62. The transverse direction upper end portions of the front and rear walls 62 are connected integrally to the transverse direction both end portions of the upper wall 64. Accordingly, as shown in FIG. 8, at portions of the front and rear walls 62, the base main body 60 is formed in a substantially concave shape in cross-section, which opens substantially toward the bottom of the vehicle.

A plate-shaped first rib 66 is provided between the front and rear walls 62. The first rib 66 is formed as a plate shape whose longitudinal direction is substantially along the longitudinal direction of the longitudinal plates 62, and whose thickness direction is the direction in which the front and rear walls 62 oppose one another. However, at a side of the first rib 66 further toward one side than the longitudinal direction intermediate portion thereof (i.e., at the vehicle body side thereof), the first rib 66 is bent substantially toward the rear of the vehicle with respect to the other longitudinal direction side of the first rib 66, and is joined to the base portion 52 in the vicinity of a joined portion of the base portion 52 and the front and rear wall 62 which is positioned relatively toward the substantially vehicle rear side among the pair of front and rear walls 62. Further, a transverse direction upper end portion of the first rib 66 is joined to the upper wall 64.

Longitudinal direction one end portions of a pair of upper and lower walls 68, which together with the front and rear walls 62 form the base main body 60, are connected to the other longitudinal direction end portions of the front and rear walls 62 and the first rib 66 (the end portions of the front and rear walls 62 and the first rib 66 at the side opposite the vehicle body).

The longitudinal direction of the upper and lower walls 68 is substantially along the longitudinal direction of the front and rear walls 62. However, the thickness directions of the upper and lower walls 68 are substantially the vertical direction of the vehicle, and the upper and lower walls 68 oppose one another along the thickness directions thereof. A front wall 70, whose thickness direction is along the transverse direction of the upper and lower walls 68, is provided at the transverse direction rear end sides of the upper and lower walls 68. The front wall 70 is formed in a plate shape whose longitudinal direction is along the longitudinal direction of the upper and lower walls 68, and whose thickness direction is substantially along the transverse direction of the upper and lower walls 68. The front wall 70 is formed so as to extend from the other longitudinal direction end portion of the front and rear wall 62 which is positioned relatively toward the substantially vehicle front side among the front and rear walls 62.

Figure 10:
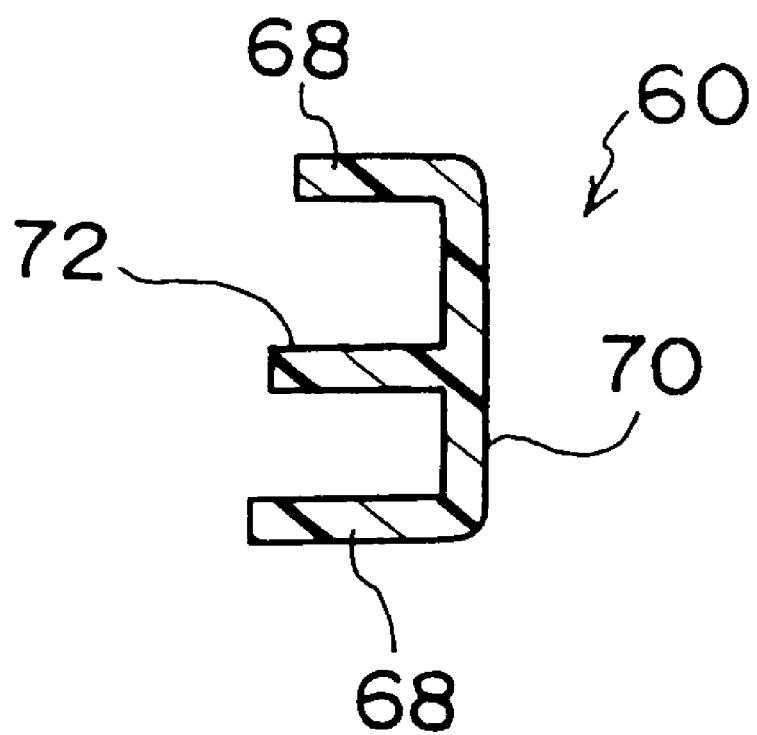
FIG. 10 is a cross-sectional view of the base main body at an upper and lower walls portion.

The transverse direction front end portions of the upper and lower walls 68 are connected integrally to the transverse direction both end portions of the front wall 70. Accordingly, as shown in FIG. 10, at portions of the upper and lower walls 68, the base main body 60 is formed in a substantially concave shape in cross-section, which opens substantially toward the vehicle rear side.

A plate-shaped second rib 72 is provided between the upper and lower walls 68. The second rib 72 is formed in a plate shape whose longitudinal direction is substantially along the longitudinal direction of the upper and lower walls 68, and whose thickness direction is the opposing direction of the upper and lower walls 68. One longitudinal direction end portion of the second rib 72 is joined to the longitudinal direction other end portions of the front and rear walls 62 and the first rib 66, and the transverse direction front end portion of the second rib 72 is joined to the front wall 70.

The longitudinal direction other end side of the upper and lower wall 68 which is positioned relatively toward the substantially vehicle lower side among the pair of upper and lower walls 68, is bent substantially toward the vehicle upper side. The longitudinal direction other end portion of the second rib 72 is connected to this bent portion. Further, a tubular boss 74, whose axial direction is along the substantially longitudinal direction of the vehicle, is formed at the longitudinal direction other end portions of the upper and lower walls 68. The previously-mentioned mirror driving unit 26 is screwed to the boss 74.

Figure 6:
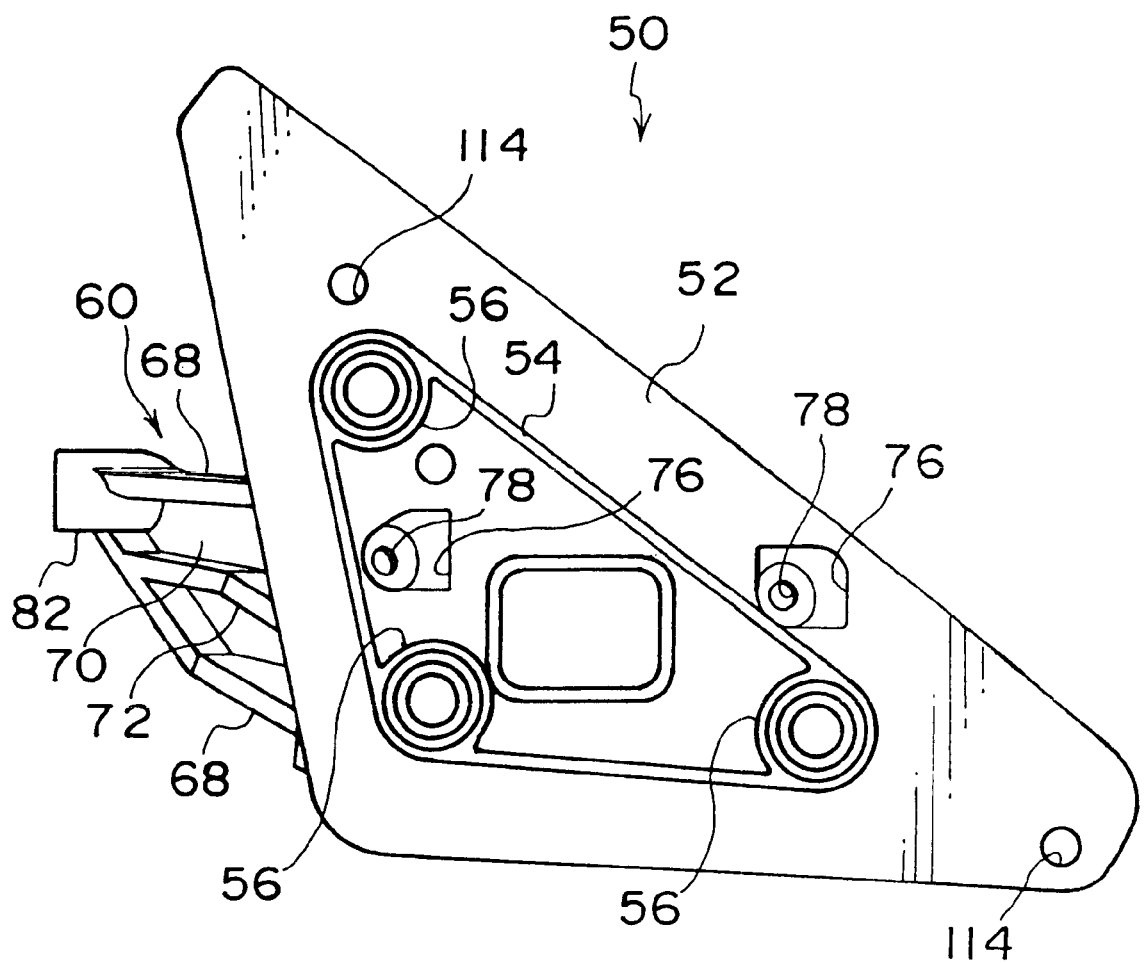
FIG. 6 is a side view of a base as seen from the vehicle body.

On the other hand, as shown in FIG. 6, a pair of opening portions 76 are formed in the base portion 52. The opening portions 76 are substantially square, and are open at one thickness direction side thereof (i.e., at the vehicle body side thereof). However, the opening portions 76 are more shallow than the thickness of the base portion 52, and each have a bottom at a thickness direction intermediate portion of the base portion 52. Further, a substantially circular through hole 78 is formed in the bottom of each opening portion 76.

Fixing screws 80, which serves as fastening devices, pass through the through holes 78, and are screwed into bosses 82 which are formed at the side wall 36 of the visor 12. In this way, the visor 12 and the base 50 are connected integrally.

Moreover, as shown in FIG. 1, a stay cover 90, which serves as a cover, is provided between the base portion 52 of the base 50 and the visor 12.

<Structure of Stay Cover 90>

Figure 11:
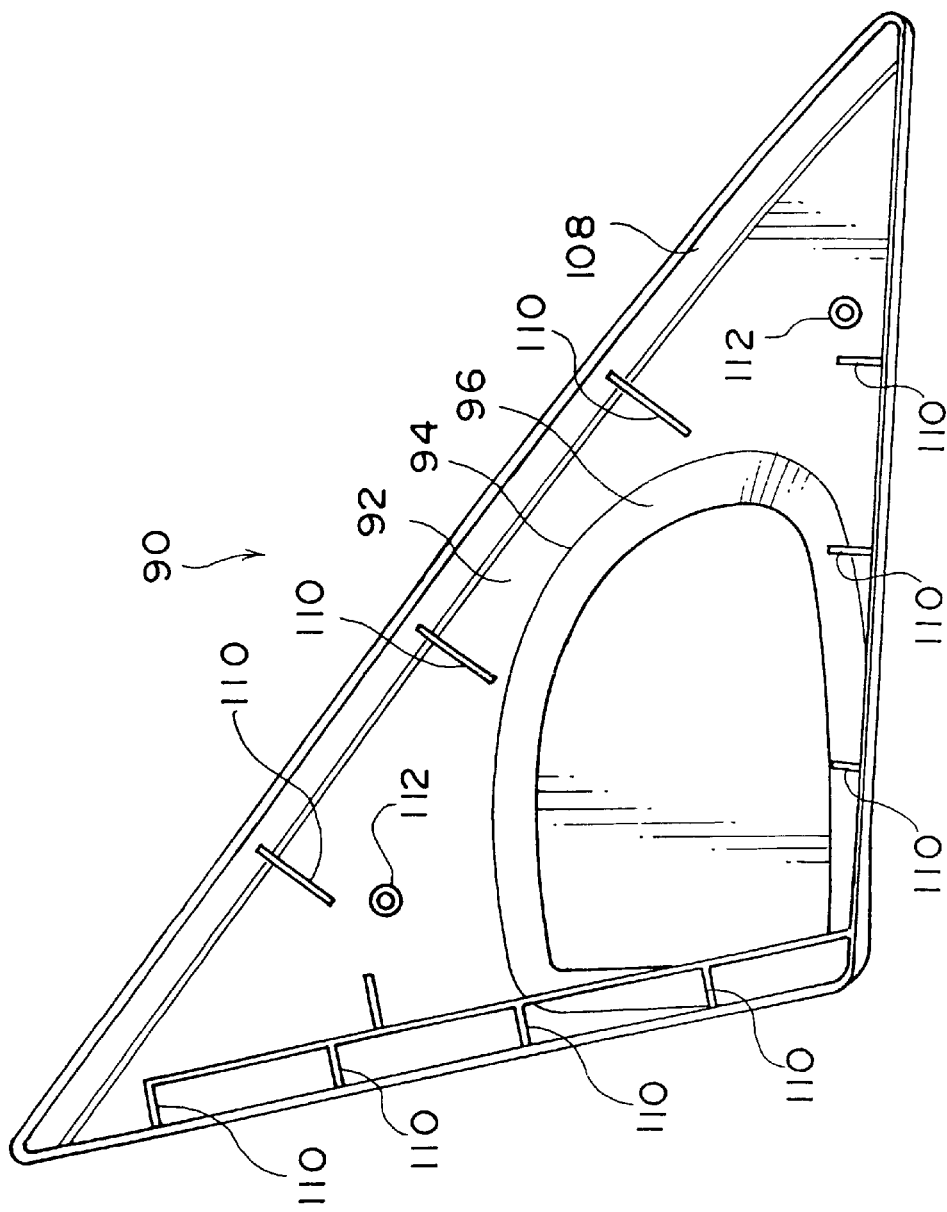
FIG. 11 is a side view of a cover (stay cover) as seen from the vehicle body.

As shown in FIGS. 1 and 11, the stay cover 90 has a plate-shaped base portion 92. The base portion 92 is formed in a substantially triangular shape which is substantially similar to the base portion 52 of the base 50, but which is sufficiently larger than the base portion 52. A through hole 94, which passes through in the thickness direction, is formed in the base portion 92. The through hole 94 is smaller than the base portion 52 of the base 50, but is of a size through which the fixing screws 80 and the base main body 60 of the base 50 can pass. The base main body 60 passes through the through hole 94 and enters into the inner side of the visor 12. The fixing screws 80 pass through the through hole 94 and are screwed together with and fixed to the bosses 82.

Figure 12:
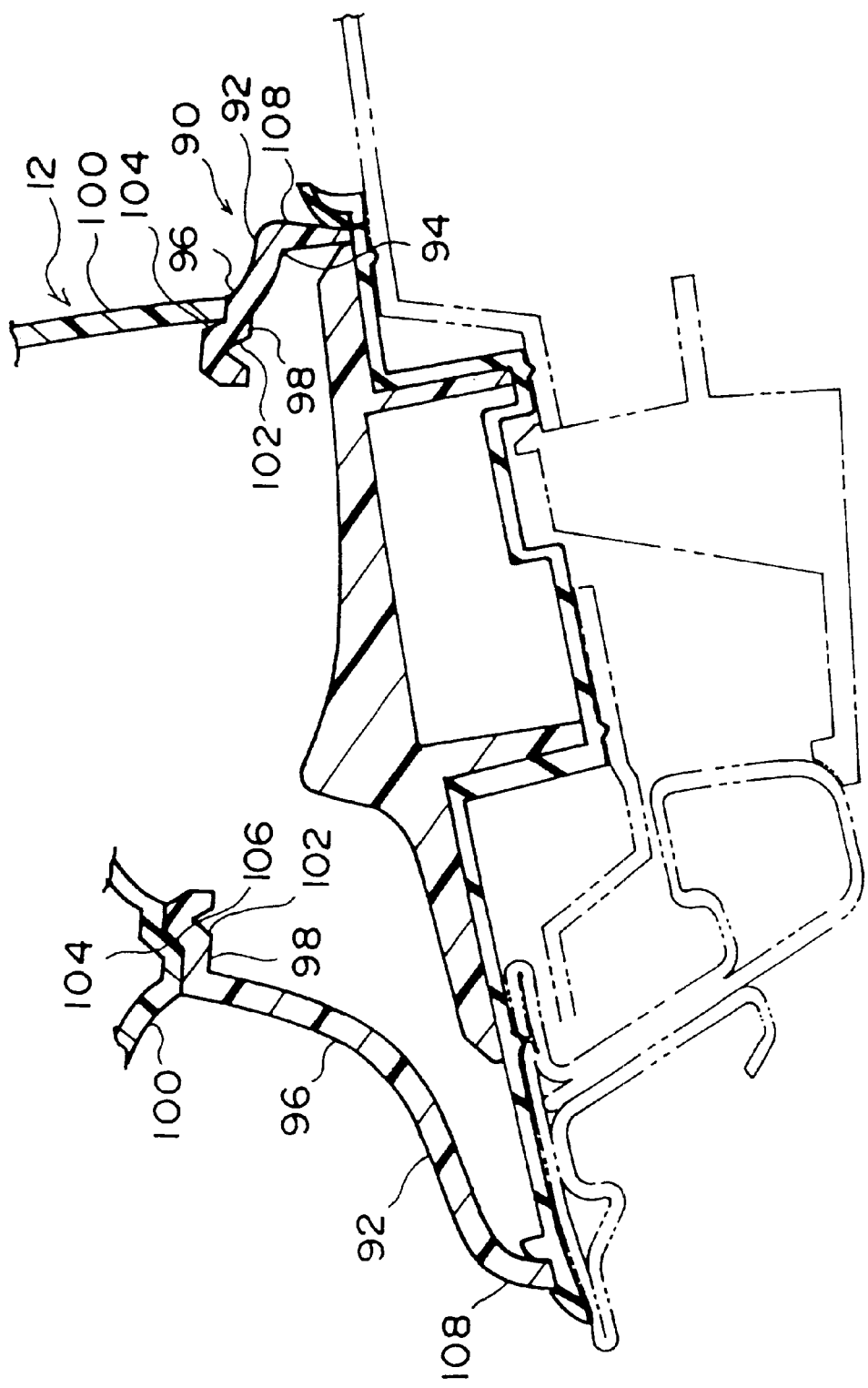
FIG. 12 is an enlarged cross-sectional view in a vicinity of press-contacting portions of the cover and the visor.

Further, a peripheral wall 96 is formed along the inner peripheral portion of the through hole 94 at the thickness direction other side of the base portion 92 (i.e., at the side opposite the vehicle body). As is shown in FIG. 12 in which main portions are illustrated in an enlarged manner, a substantially ring-shaped visor receiving portion 98 is formed at the opening end of the peripheral wall 96. In the state in which the door mirror 10 is assembled, the opening end of a peripheral wall 100, which is formed at the side wall 36 of the visor 12, press-contacts the visor receiving portion 98.

As shown in FIG. 12, a bent portion 102, which is bent toward the visor 12 with respect to the opening radial direction inner side, is provided at the opening radial direction intermediate portion of the visor receiving portion 98. The surface, at the visor 12 side, of the bent portion 102 is an inclined surface 104 which is directed toward the opening radial direction outer side of the visor receiving portion 98 with respect to the visor 12 side.

An inclined surface 106, which opposes the inclined surface 104, is formed at one portion of the peripheral wall 96 of the stay cover 90 so as to correspond to the inclined surface 104. In the state in which the door mirror 10 is assembled, the inclined surface 104 and the inclined surface 106 press-contact one another.

As shown in FIGS. 1 and 11, a peripheral wall 108 is formed along the outer peripheral portion of the base portion 92 at one thickness direction side of the base portion 92. A plurality of ribs 110 stand upright from the base portion 92 at the inner side of the peripheral wall 108. In the state in which the door mirror 10 is assembled, the base portion 52 of the base 50 press-contacts the ribs 110.

A pair of positioning pins 112 stand upright from one thickness direction side of the base portion 92. Positioning holes 114 are formed in the base portion 52 of the base 50 so as to correspond to the positioning pins 112. Due to the positioning pins 112 passing through the positioning holes 114 and the base portion 52 abutting the ribs 110, the relative positional relationship of the base portion 52 with respect to the base portion 92 (i.e., the relative positional relationship of the base 50 with respect to the stay cover 90) is determined.

<Operation and Effects of the Present Embodiment from the Standpoint of Assembly>

Next, the operation and effects of the present embodiment from the standpoint of assembly will be described by an overview explanation of assembly of the door mirror 10.

In the door mirror 10, the base main body 60 of the base 50 is passed through the through hole 94 formed in the stay cover 90. Next, while the positioning pins 112 formed at the base portion 92 of the stay cover 90 are passed through the positioning holes 114 formed in the base portion 52 of the base 50, the base portion 52 of the base 50 abuts the ribs 110, and positioning of the base 50 with respect to the stay cover 90 is carried out.

Then, the base main body 60 is made to pass through the opening portion 38 formed in the side wall 36 of the visor 12, and the opening end of the peripheral wall 100 of the visor 12 is made to coincide with the opening end of the peripheral wall 96 of the stay cover 90.

In this state, the fixing screws 80 are passed through the through holes 78 formed in the base portion 52 of the base 50. The fixing screws 80 are screwed into and fastened to and fixed to the bosses 82 formed at the visor 12.

Here, the fixing screws 80 are screwed into the bosses 82 until the opening end of the peripheral wall 96 of the stay cover 90 press-contacts the opening end of the peripheral wall 100 of the visor 12 and the base portion 52 of the base 50 press-contacts the ribs 110, i.e., until the base portion 52 of the base 50 and the peripheral wall 100 of the visor 12 nip the stay cover 90 with a nipping force of a predetermined magnitude.

As described above, in the state in which the visor 12, the stay cover 90, and the base 50 are assembled together, the mirror driving unit 26 and the mirror main body 30 are assembled within the visor 12.

In this way, at the door mirror 10, due to the stay cover 90 being nipped by the base portion 52 of the base 50 and the peripheral wall 100 of the visor 12, the stay cover 90 is held between the base 50 and the visor 12. Thus, there is no need for a special fixing member for fixing the stay cover 90. The number of parts of the members forming the door mirror 10 can be reduced, and costs can be reduced.

Basically, the fixing screws 80 are members for fixing the base 50 and the visor 12. The screwing of the fixing screws 80 into the bosses 82 is the process for fixing the base 50 and the visor 12. However, because the stay cover 90 can be fixed in this process, there is no need for a special process for fixing the stay cover 90. As a result, the number of processes for assembling the door mirror 10 can be reduced, which contributes to a reduction in costs.

The direction of nipping of the stay cover 90 by the visor 12 and the base 50 substantially coincides with the direction in which the fixing screws 80 are screwed into the bosses 56. Thus, it is easy to adjust the nipping force of nipping the stay cover 90. Further, because the direction of nipping by the visor 12 and the base 50 substantially coincides with the screwing-in direction of the fixing screws 80, basically, assembly from one direction is possible, and thus, the workability improves.

Moreover, when the peripheral wall 100 of the visor 12 and the peripheral wall 96 of the stay cover 90 press-contact one another, at a portion thereof, the inclined surface 104 of the peripheral wall 96 and the inclined surface 106 of the peripheral wall 100 press-contact one another. In this way, because the direction of press-contact of the inclined surfaces 104, 106 is inclined with respect to the direction of application of the nipping force, stress can be dispersed at the inclined surface 106. Thus, it is possible to prevent or lessen the generation of strain at the press-contact portion of the stay cover 90 or the like. The stay cover 90 and the visor 12 can thereby be made to press-contact each other with no gaps therebetween, and the external appearance can be improved.

<Operation and Effects of the Present Embodiment from the Standpoint of External Appearance>

Next, the operation and effects of the present embodiment will be described from the standpoint of the external appearance of the door mirror 10.

In the present embodiment, the shielding rib 34, which is formed to project from at least a portion of the vehicle body side of the inner peripheral portion of the visor 12 further toward the bottom portion 14 side of the visor 12 than the mirror main body 30, is positioned, with respect to the gap between the inner peripheral portion of the visor 12 and the outer peripheral portion of the mirror main body 30, at the bottom portion 14 side along the direction of opening of this gap. Accordingly, the mirror driving unit 26, the wiring for the mirror driving unit 26, and the like, which are housed at the inner side of the visor 12, are positioned at the side of the shielding rib 34 opposite the side at which this gap is formed. Thus, when even viewing the inner side of the visor 12 from the opening end side of the visor 12 via this gap, the inner side of the visor 12 is shielded by the shielding rib 34, and the mirror driving unit 26, the wiring for the mirror driving unit 26, and the like cannot be seen. The overall external appearance of the door mirror 10 thereby improves.

Moreover, the shielding rib 34 is thinner than the visor 12. Thus, the possibility of defects in the external appearance, such as so-called "shrinkage" in the vicinity of the opening portion of the visor 12, arising due to formation of the shielding rib 34 is extremely small, and this contributes to a decrease in costs.

<Operation and Effects of the Present Embodiment from the Standpoint of Function>

Next, the operation and effects of the present embodiment will be described from the standpoint of the function of the door mirror 10.

The door mirror 10 is mounted to a vehicle by the bolts 58 which are provided at the bosses 74 of the base 50. In this way, at the door mirror 10 which is assembled to the vehicle, the great weight of the visor 12, the mirror main body 30, the mirror driving unit 26 and the like is applied at the base portion 52 side of the base main body 60 of the base 50.

Here, at the base portion 52 side of the base main body 60, the great load of the visor 12, the mirror main body 30, the mirror driving unit 26, and the like are greatly applied. However, the base portion 52 of the base main body 60 is formed by the pair of front and rear walls 62 which oppose one another longitudinally. Thus, the strength in a direction along the substantially vertical direction of the vehicle is improved. Further, the first rib 66 is provided between the front and rear walls 62, and the strength in the direction along the substantially vertical direction of the vehicle is further improved. Thus, sufficient strength can be obtained without making the thickness of the base 50 particularly thick, and costs can be decreased, and a contribution is made to lightening of the weight.

On the other hand, while the vehicle is traveling, a large wind pressure during traveling of the vehicle is applied to the distal end side of the base main body 60. However, the distal end side of the base main body 60 is structured by the pair of upper and lower walls 68. Thus, the strength in the direction along the substantially longitudinal direction of the vehicle is improved. Moreover, the second rib 72 is provided between these upper and lower walls 68, and the strength in the direction along the substantially longitudinal direction of the vehicle is further improved. As a result, sufficient strength can be obtained without making the thickness of the base 50 particularly thick, and costs can be decreased, and a contribution is made to lightening of the weight.

The substantially vehicle bottom side is open at the portion at which the longitudinal plates 62 forming the base main body 60 are provided. Thus, even if rain water were to enter into or water drops due to dew condensation were to adhere to the region between the front and rear walls 62, such water drops would fall down and would be able to be drained.

<Variant Example of Second Rib 72>

Figure 13:
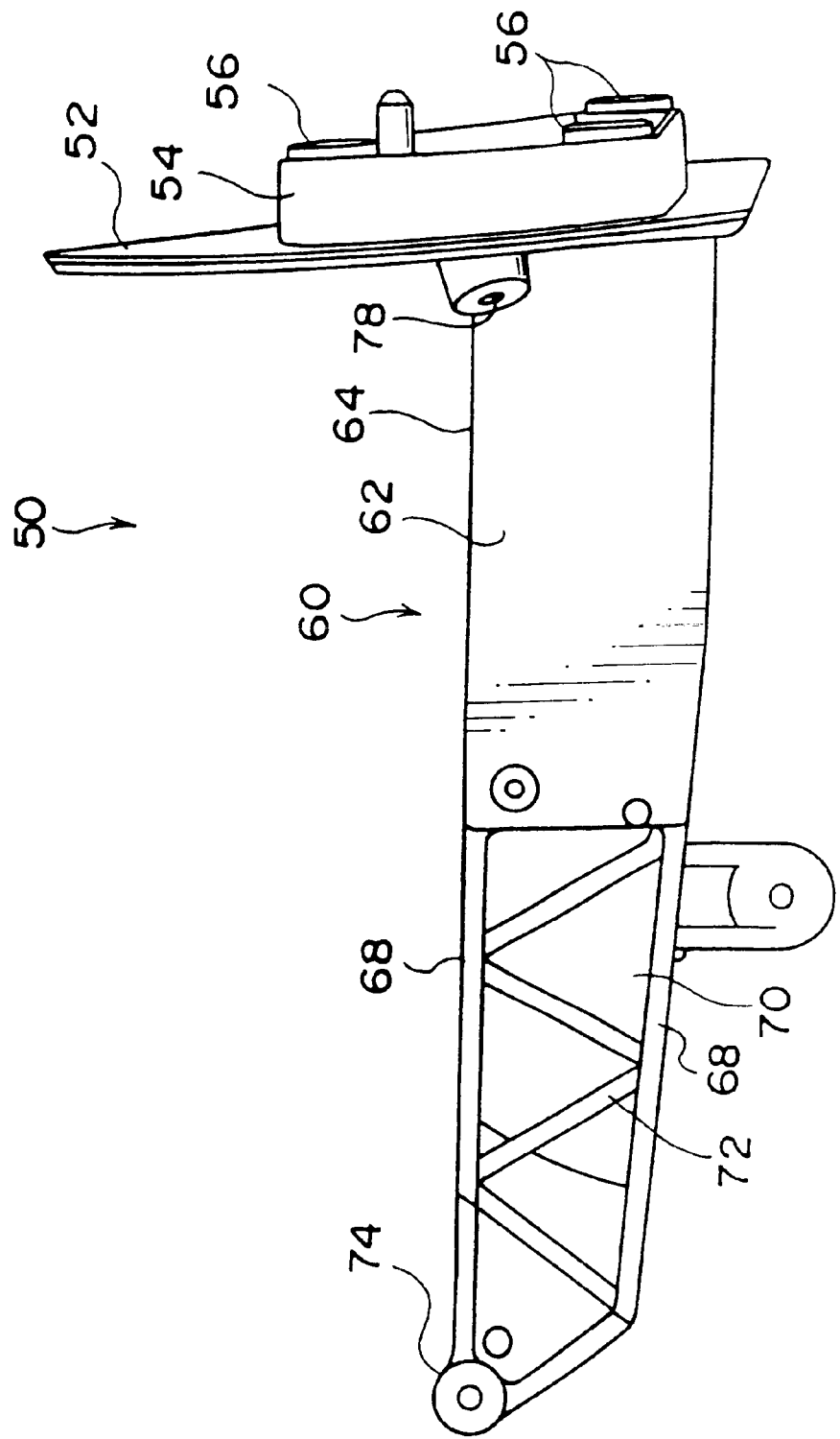
FIG. 13 is a front view which corresponds to FIG. 9 and which illustrates a variant example of a second rib.

Next, a variant example of the present embodiment will be described. A variant example of the second rib 72 is shown in FIG. 13. In this variant example, the second rib 72 is not merely plate-shaped, and is bent in a zigzag between the upper and lower walls 68 at the longitudinal direction intermediate portion thereof.

In this way, by bending the second rib 72 into a zigzag, the additional effect can be obtained that, not only the strength in the direction along the substantially longitudinal direction of the vehicle, but also the strength in the substantially vertical direction of the vehicle and the like can be improved.

This variant example is a variant example of the second rib 72. However, the first rib 66 may be bent in a zigzag between the upper and lower walls 68 at the longitudinal direction intermediate portion thereof. In this case, the additional effect can be obtained that, not only the strength in the direction along the substantially vertical direction of the vehicle, but also the strength in the substantially longitudinal direction of the vehicle and the like can be improved.

As described above, in the present invention, sufficient strength against wind pressure when the vehicle is traveling and against an overall load can be ensured, and because only strength in the needed directions is obtained, costs can be reduced.

What is claimed is:

1. A mirror assembly for mounting to a vehicle, the mirror assembly comprising:
   a visor and a mirror main body accommodated in the visor, the mirror main body including a reflecting surface,
   a base provided between the vehicle and the visor, connecting the visor to the vehicle when the mirror assembly is mounted thereto, the base including a base main body comprising:
   (a) a plurality of front and rear walls opposing one another along a substantially longitudinal direction of the vehicle;
   (b) a plurality of upper and lower walls which oppose one another along a substantially vertical direction of the vehicle and which are joined integrally to the front and rear walls at a side of the front and rear walls opposite the vehicle;
   (c) a first rib which is provided between the front and rear walls for supplementing strength of the base main body along the substantially vertical direction of the vehicle; and
   (d) a second rib which provided between the upper and lower walls for supplementing strength of the base main body along the substantially longitudinal direction of the vehicle.

2. A mirror assembly according to claim 1, wherein a substantially vehicle lower side end portion of the base main body where the front and rear walls are provided, is open.

3. A mirror assembly according to claim 1, wherein the second rib includes a first longitudinal direction end portion, and the front and rear walls and the first rib include longitudinal direction end portions, with the first longitudinal direction end portion of the second rib joined to at least some of the longitudinal direction end portions of the front and rear walls and the first rib.

4. A mirror assembly according to claim 1, wherein the base includes a generally triangular, plate-shaped base portion, with a pair of opening portions formed therein comprising through holes; the visor including a sidewall comprising bosses; and fastening devices connecting the visor and the base to one another via the through holes and bosses.

5. A mirror assembly according to claim 2, wherein the second rib comprises a substantially flat-plate shape disposed between the upper and lower walls.

6. A mirror assembly according to claim 2, wherein the second rib comprises a plurality of V-shapes between the upper and lower walls.

7. A mirror assembly according to claim 3, wherein one longitudinal direction end portion of the upper and lower walls includes a bent portion positioned at a substantially vehicle lower side relative to the upper and lower walls, which bends substantially toward a vehicle upper side, and the second rib includes a second longitudinal direction end portion joined to the bent portion.

8. A mirror assembly according to claim 3, further comprising, at transverse direction rear end sides of the upper and lower walls, a front wall including a thickness direction along a transverse direction of the upper and lower walls, with transverse direction front end portions of the upper and lower walls are connected integrally with both transverse direction end portions of the front wall.

9. A mirror assembly according to claim 5, wherein the first rib is folded over at a plurality of locations along a transverse direction periphery of the first rib, at a longitudinal direction intermediate portion of the first rib.

10. A mirror assembly for mounting to a vehicle exterior, the mirror assembly comprising:

(a) a visor housing a mirror; and
(b) a base including:
   (i) a vehicle side section comprising a first rib and front and rear walls defining an open region therebetween, the first rib being disposed in the open region, the front and rear walls and first rib projecting from the vehicle side section substantially parallel to one another, the vehicle side section including an end adapted for mounting to the vehicle exterior with the front and rear walls and first rib all projecting from the vehicle side section in a direction substantially orthogonal to the vehicle longitudinal and lateral axes; and
   (ii) a visor side section extending from the vehicle side section, the visor side section including a second rib and upper and lower walls defining another open region, the second rib being disposed in said another open region, the upper and lower walls and the second rib projecting from the visor side section in a direction substantially orthogonal to the projection direction of the front and rear walls and first rib, and the visor side section including an end adapted for connection to the visor.

11. A mirror assembly according to claim 10, wherein the second rib forms a plurality of V-shapes between the upper and lower walls.

* * * * *